United States Patent
Hessel

(10) Patent No.: US 7,144,216 B2
(45) Date of Patent: Dec. 5, 2006

(54) WIND TURBINE WITH OUTER NOISE SHELL

(75) Inventor: Christoph Hessel, Meppen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/936,902

(22) Filed: Sep. 8, 2004

(65) Prior Publication Data
US 2005/0186076 A1 Aug. 25, 2005

(30) Foreign Application Priority Data
Sep. 10, 2003 (DE) ................. 103 41 759

(51) Int. Cl.
*F03D 11/04* (2006.01)
(52) U.S. Cl. .............. 415/119; 416/DIG. 6; 415/909
(58) Field of Classification Search ........... 416/134 R, 416/132 B, DIG. 6, 909; 415/909
See application file for complete search history.

(56) References Cited

U.S. PATENT DOCUMENTS

| | | | | |
|---|---|---|---|---|
| 4,180,369 A | * | 12/1979 | Ottosen | 415/208.1 |
| 6,213,721 B1 | * | 4/2001 | Watkinson | 416/244 A |
| 6,998,729 B1 | * | 2/2006 | Wobben | 290/54 |
| 2003/0111843 A1 | * | 6/2003 | Tallal et al. | 290/55 |

* cited by examiner

*Primary Examiner*—Richard A. Edgar
(74) *Attorney, Agent, or Firm*—Blakely, Sokoloff, Taylor & Zafman LLP

(57) ABSTRACT

For reduction of the noise radiation of a wind turbine with a tower (1) having an outside (8), a noise shell (4) is provided, which at least partially surrounds the outside (8) of the tower (1) and is positioned at a distance from the outside (8) of the tower (1). An air gap (24) remains between the tower wall (2) and the noise shell (4). The noise emitted from the tower wall (2) is absorbed by the noise shell (4). The noise shell can be composed of a waterproof outer layer (6) and a damping layer (10) directed towards the tower wall (2).

20 Claims, 3 Drawing Sheets

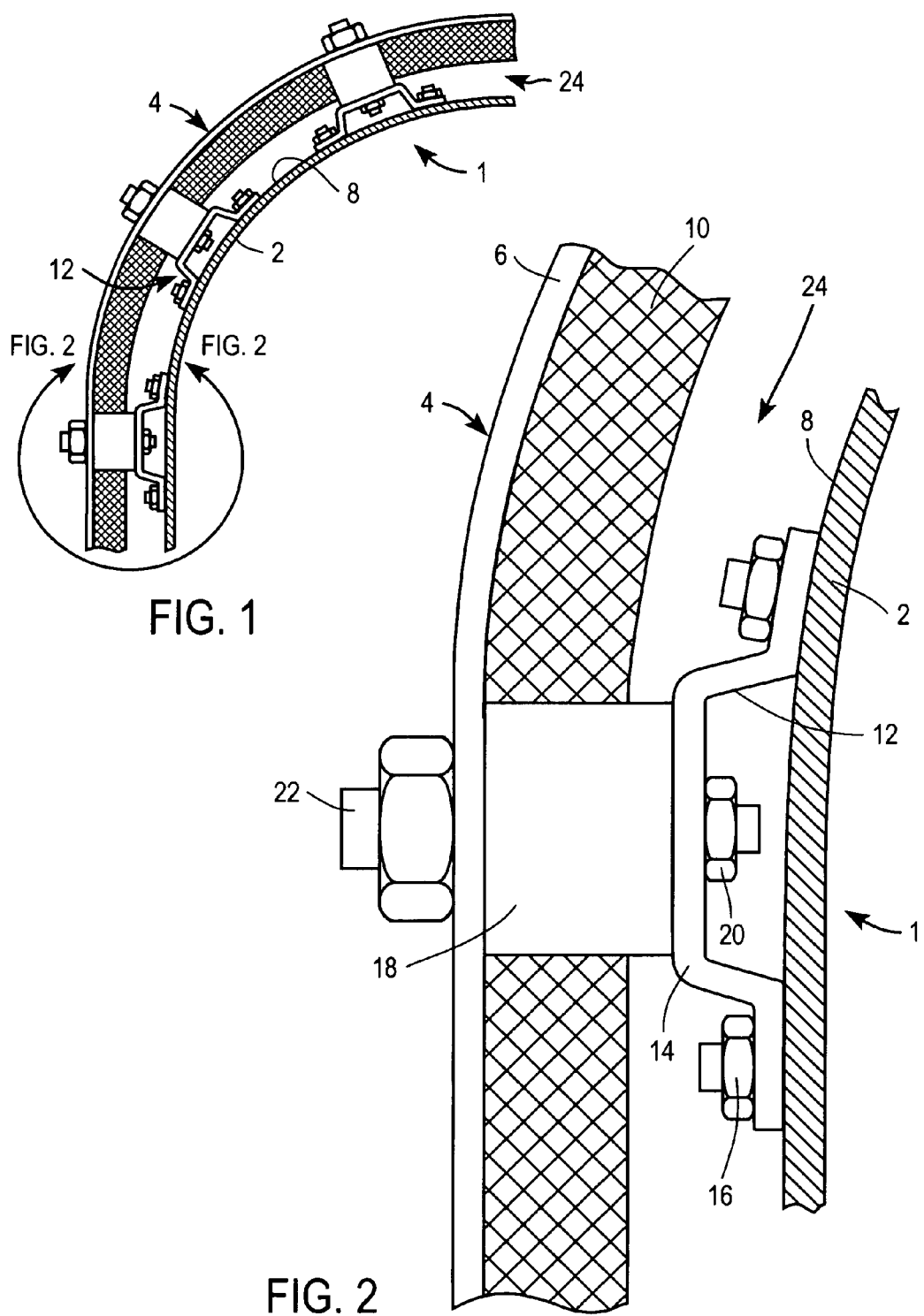

WIND TURBINE WITH OUTER NOISE SHELL

The present application claims priority to corresponding German Application No. 10341759.1 filed on Sep. 10, 2003, the entire contents of which are hereby incorporated by reference.

BACKGROUND OF THE INVENTION

1. Field of the Invention

The invention is in the field of wind turbines and relates to a wind turbine with a tower having an outside.

2. Description of the Related Art

Wind turbines are increasingly used for the generation of electrical energy. Principally, wind turbines consist of a tower, a nacelle located on the tower and a rotor, which is rotatably supported in the nacelle by means of a shaft. In modern wind turbines, the rotor typically has three rotor blades. The rotor blades, which have an aerodynamic profile, experience an ascending force on flowing-against by the wind and, thereby, achieve a rotational movement on the rotor. The shaft of the rotor transmits this rotational movement to a generator accommodated within the nacelle for energy generation. The transmission of the rotational movement can be arranged by means of a gearbox, in order to increase the number of revolutions provided to the generator.

During the operation of a wind turbine, sounds develop that can be found disturbing. For technical systems there are legal limitations regarding the permitted intensity of a mean noise radiation. The legal limitations in Germany, which are based on DIN-standard 2058, allow maximum values of for example 65 dB(A) in industrial regions during the day, however, merely 35 dB(A) in pure housing areas during the night. These values also have to be met by wind turbines.

Noises created by a wind turbine are, on the one hand, air-born noises that are generated by the wind striking the rotor blades and the tower and, on the other hand, noises generated by moving mechanical components (structural-born noise). The latter are typically generated in the nacelle by the generator and the gearbox, yet also ancillary equipment like cooling ventilators, pumps, as well as bearings and the azimuth drive for the rotation of the nacelle. Structural-born noises can have defined frequency peaks, which are generated for example by the frequency of interlocking teeth (meshing frequency) of the gearbox. The noises are transmitted as impact sound by existing structures and are emitted by large surfaces in the surrounding area. The tower with its comparably large outer surface forms a specifically good emitting surface. Further, the tower forms a resonator, which amplifies frequencies in the range of 1 to 500 Hz.

In order to minimize the noise, a variety of proposals have been made. For example, within U.S. Pat. No. 6,224,341 B1 (Edge Innovations & Technology), the attempt is made to reduce noise generation of moving hollow components by filling them with granular material of low density. Thereby, an internal damping is to be realized. However, this solution requires a re-design of the existing system. A different measure is taken by DE 199 30 751 A1 (Franz Mitsch). Therein, soft bearings for the gearbox and the generator should decouple these noise sources from other components and especially from the tower, in order to interrupt, thereby, the transmission path of the impact sound. Finally, it is known from U.S. Pat. No. 6,213,721 B1 (Thomson Marconi Sonar Limited) to affix metal plates on the tower wall using a damping plastic layer. The size of the plastic layer and the mass of the metal plates are to be adjusted such that the radiation of certain frequencies is reduced.

The noise reduction achieved with these proposals often does not meet the legal requirements or are not justifiable for economical reasons.

Therefore, an improved noise radiation reduction of the wind turbine is desirable, which is at the same time feasible and simple.

This object is solved by a wind turbine with a tower, having an outside, and a noise shell, which at least partially surrounds the outside of the tower and is positioned at a distance from the outside of the tower.

The noise shell which at least partially surrounds the tower serves the purpose of absorbing the noise emitted from the tower and, therefore, results in a considerable reduction of the noise emission of the wind turbine. Thereby, the noise shell forms a kind of noise cladding, which is positioned at a distance from the outside of the tower, that is an air gap remains between the wall of the tower and the noise shell. Therefore, no direct transmission path for the noise exists between the tower and the noise shell, so that the noise cannot be transmitted from the tower to the noise shell as impact sound. The wall of the tower oscillates rather freely and emits these oscillations as noise like a tower not provided with a noise shell. The noise, which is normally widely emitted is, however, intercepted by the noise shell and absorbed.

This solution has the advantage that the oscillation characteristics of the tower wall are only marginally amended. The tower can be surrounded by the noise shell at a later date, provided that a noise reduction is required.

In one embodiment of invention the noise shell comprises an outer layer and a damping layer directed towards the tower. The damping layer leads to extensive absorption of the noise. In contrast, the outer layer serves as a stabilizer of the noise shell and protects the damping layer from the effects of the weather. For example, the outer layer can be formed of glass-fiber reinforced plastic or aluminium. Preferably, the noise shell is formed with a closed, waterproof outer layer.

In a further embodiment of the invention, the noise shell is attached to the outside of the tower with a support. Thereby, the support should assure an oscillation-decoupling between the tower wall and the noise shell, that is, it should be oscillation damping. This can for example be realized by oscillation damping elements between the noise shell and the tower wall.

Often it is sufficient if the noise shell only surrounds the upper part, for example only the upper third of the tower, entirely, since the noise radiation essentially happens there.

SUMMARY OF THE INVENTION

A wind turbine with an outer noise shell is described. In one embodiment, the wind turbine comprises a tower (1) having an outside and a noise shell (4), which at least partially surrounds the outside (8) of the tower (1) and is positioned at a distance from the outside (8) of the tower (1).

BRIEF DESCRIPTION OF THE DRAWINGS

In the following, the invention is described by concrete embodiments and further described by the figures. Thereby, it is shown within:

FIG. 1 is a part of the tower wall;

FIG. 2 is a noise shell with a first support;

DESCRIPTION OF THE PREFERRED EMBODIMENTS

Figure 3:
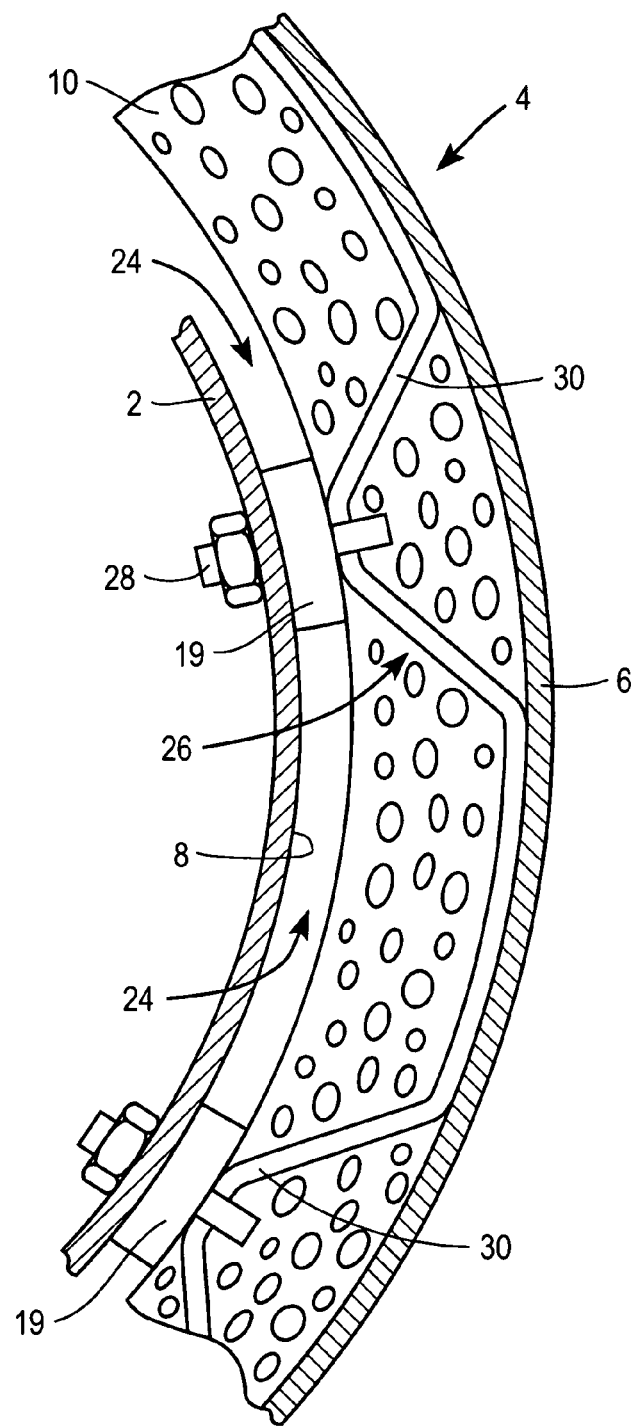
FIG. 3 is a noise shell with a second support.

In the following it is referred to the presently preferred embodiments shown in the figures. Each embodiment merely serves as a more detailed exemplification of the invention and is not to be understood as limiting the invention. For example, the features shown in one of the embodiments can also be used in another embodiment or can be combined with features of other embodiments, in order to obtain further modified embodiments within the scope of the invention.

FIG. 1 shows a part of a tower 1 of a wind turbine. Thereby, the tower wall is denoted as 2 and the noise shell fixed to the outside 8 of the tower wall 2 is denoted as 4. Tower wall 2 and noise shell 4 are separated from each other by air gap 24. The noise shell 4 is fixed to the tower wall 2 only by means of support 12. For better understanding, the sector marked with a circle is drawn to a larger scale in FIG. 2.

Noise shell 4 is made up of an outer layer 6 and a damping layer 10 directed towards the tower wall 2. The waterproof designed outer layer can be made of aluminium or glass-fiber reinforced plastic. These materials have a relatively low net weight and, at the same time, sufficient stability and weatherproofness. If necessary, the outer layer 6 can be provided with a cover for further improvement of the weatherproofness. At the same time the outer layer 6 serves as a carrier for the damping layer 10, which can be composed of polyurethane foam, melamine foam, or fiberglass wool. A good noise absorption can for example be realized with a 20 to 50 cm thick damping layer.

The air gap 24, the size of which should be between 10 cm and 50 cm, remains between the noise shell 4 and the outside 8 of the tower wall 2. Thereby, a free oscillation of the tower wall 2 and, thus, a noise radiation is possible.

In order to avoid the transmission of the oscillations of the tower wall 2 directly as impact sound to the noise shell 2, the noise shell is fixed to the tower wall 2 by an oscillation isolating support 12. This support is in this example formed of a plurality of clamps 14 which are fixed to the tower wall 2 by screwing bolts 16. In their middle convex part, clamps 14 support each a damping element 18, which can be for example a rubber roll, to which the noise shell 4 is fixed. The damping elements 18 are attached to the clamps with bolts 20 and to the noise shell with bolts 22. The connection between the noise shell 4 and clamps 14 is, thereby, only realized by the damping elements 18, whereby the transmission path for the impact sound between the tower wall and the noise shell is interrupted. Therefore, the tower wall 2 cannot transmit its oscillation directly to the noise shell 4, but emits the oscillations as noise. The noise emitted thereby is, however, intercepted and absorbed by the noise shell surrounding the tower. The noise shell can, thus, be considered a noise cladding. In order to realize a good noise absorption and to protect the damping layer 10 sufficiently, the noise shell 4 should be outwardly closed, that is it should form with its outer layer 6 a closed, waterproof front.

Within FIG. 3, a noise shell 4 is shown that is connected to the tower 1 with a slightly different support 26. The noise shell itself is built as shown in FIG. 2. For the support 26 shown herein, the damping elements 19 are directly connected to the outside 8 of the tower wall 2, for example screwed via bolts 28. On the side opposite the tower wall, the damping elements 19 hold up a rail 30, which is curved. This (rail) penetrates the damping layer 10 and is firmly attached to the outer layer 6 of the noise shell 4.

Figure 4:
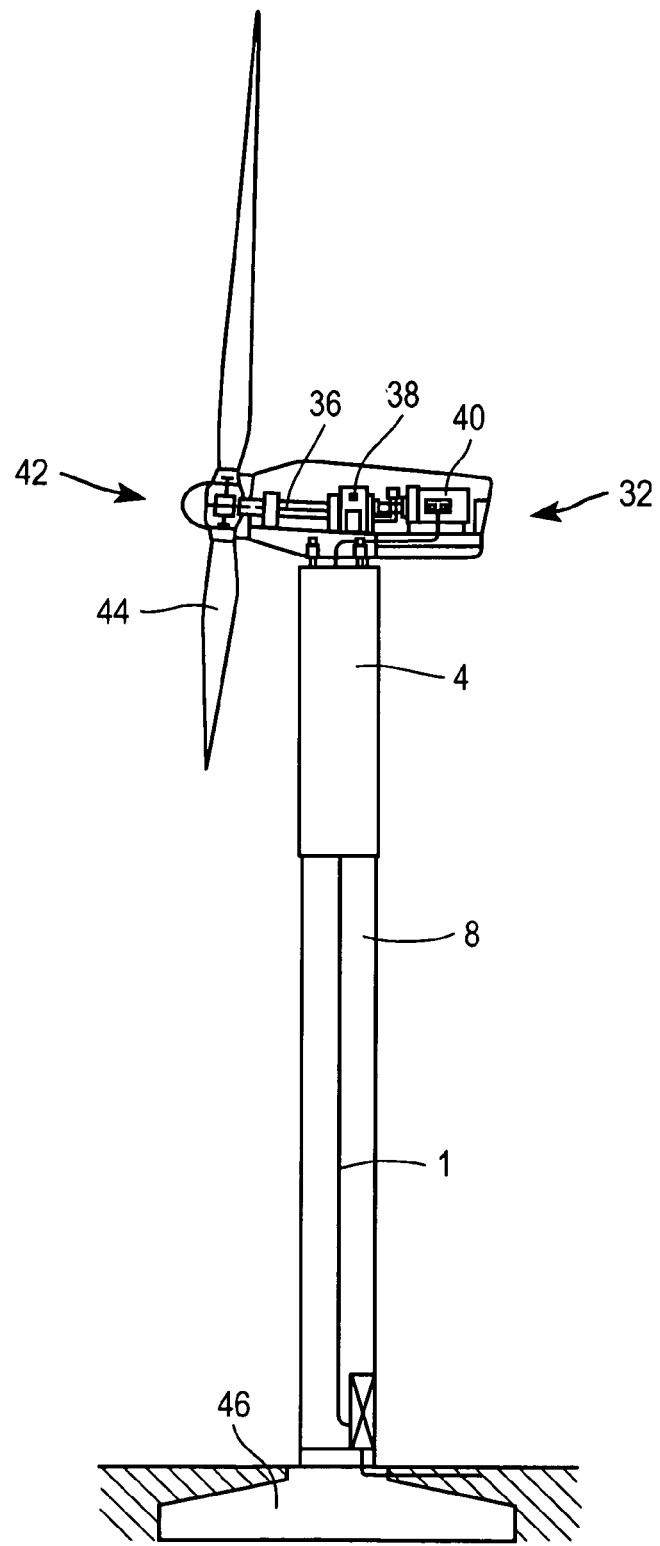
FIG. 4 is a wind turbine with a tower, the upper part of which is provided with a noise shell.

A possible embodiment of a wind turbine with a tower is shown in FIG. 4. On top of the tower 1 nacelle 32, accommodating the drive chain with rotor shaft 36, gear box 38 and generator 40, is pivoted. The rotor shaft 36 connects the rotor 42 comprising three rotor blades 44 with the gear box 38. Other possible embodiments of wind turbines, which can also be provided with an outer noise shell, can also be designed without a gear box. The wind turbine is anchored to the ground via foundations 46. In its upper third, tower 1 is entirely surrounded by noise shell 4, which intercepts and absorbs the noise emitted from the tower wall.

What is claimed is:

1. A wind turbine comprising:
   a tower having an outside; and
   a noise shell, which at least partially surrounds the outside of the tower and is positioned at a distance from the outside of the tower by at least one oscillation damping element.

2. The wind turbine according to claim 1, wherein the noise shell comprises an outer layer and a damping layer directed towards the tower.

3. The wind turbine according to claim 2, wherein the outer layer is composed of glass-fiber reinforced plastic or aluminium.

4. The wind turbine according to claim 1, wherein the noise shell is fixed to the tower with a support.

5. The wind turbine according to claim 4, wherein the noise shell surrounds the tower entirely only in its upper part.

6. The wind turbine according to claim 4, wherein the support comprises the at least one oscillation damping element.

7. The wind turbine according to claim 6, wherein the noise shell surrounds the tower entirely only in its upper part.

8. The wind turbine according to claim 2, wherein the noise shell is fixed to the tower with a support.

9. The wind turbine according to claim 8, wherein the noise shell surrounds the tower entirely only in its upper part.

10. The wind turbine according to claim 8, wherein the support comprises the at least one oscillation damping element.

11. The wind turbine according to claim 10, wherein the noise shell surrounds the tower entirely only in its upper part.

12. The wind turbine according to claim 3, wherein the noise shell is fixed to the tower with a support.

13. The wind turbine according to claim 12, wherein the noise shell surrounds the tower entirely only in its upper part.

14. The wind urbine according to claim 12, wherein the support comprises the at least one oscillation damping element.

15. The wind turbine according to claim 14, wherein the noise shell surrounds the tower entirely only in its upper part.

16. The wind turbine according to claim 2, wherein the noise shell surrounds the tower entirely only in its upper part.

17. The wind turbine according to claim 3, wherein the noise shell surrounds the tower entirely only in its upper part.

18. A wind turbine, comprising:
a tower having an outside; and
a noise shell, which at least partially surrounds the outside of the tower and is positioned at a distance from the outside of the tower by at least one damping element to create an air gap between the outside of the tower and the noise shell.

19. The wind turbine of claim 18, further comprising at least one oscillation isolation support, wherein the oscillation isolation support comprises:

one or more clamps coupled to the outside of the tower; and one or more of the damping elements coupled to the one or more clamps and the noise shell.

20. The wind turbine of claim 18, wherein the air gap has a size between approximately 10 centimetres (cm) and approximately 50 cm.

* * * * *